United States Patent
Siwinski et al.

[11] Patent Number: 6,098,668
[45] Date of Patent: Aug. 8, 2000

[54] INTEGRAL TUBE/NUT STOPPER FOR ENGINE FUEL LINE TUBE

[75] Inventors: Stanley J. Siwinski, Palos Hills; Kenneth J. Satera, Franklin Park, both of Ill.

[73] Assignee: Navistar International Transportation Corp, Chicago, Ill.

[21] Appl. No.: 09/003,418

[22] Filed: Jan. 6, 1998

[51] Int. Cl.[7] .............................. F16L 9/00; G07B 13/00
[52] U.S. Cl. .............................................. 138/177; 235/30
[58] Field of Search .............................. 210/86; 285/305; 138/109, 177; 123/508

[56] References Cited

U.S. PATENT DOCUMENTS

| | | |
|---|---|---|
| 2,165,626 | 7/1939 | Ford ........................................... 235/30 |
| 2,174,105 | 9/1939 | Haury . |
| 2,447,900 | 8/1948 | Crawley . |
| 2,461,888 | 2/1949 | Ford . |
| 2,650,837 | 9/1953 | Smith et al. ............................... 235/30 |
| 4,372,847 | 2/1983 | Lewis ........................................ 210/86 |
| 5,853,204 | 12/1998 | Bartholomew ........................... 285/305 |

Primary Examiner—Andres Kashnikow
Assistant Examiner—Davis Hwu
Attorney, Agent, or Firm—Dennis Kelly Sullivan; Jeffrey P. Calfa

[57] ABSTRACT

A fuel line assembly for an engine fuel system contains a length of nominally circular walled metal tube and a connecting fitting disposed on the tube proximate a terminus of the tube for making connection of an end of the tube containing the terminus to an engine fuel system component. The tube has a formation in a segment spaced from the terminus where the nominally circular wall has been re-formed to a non-circular oval cross section to provide an interference with the connecting fitting that prevents the fitting from sliding past the re-formation.

21 Claims, 4 Drawing Sheets

6,098,668

INTEGRAL TUBE/NUT STOPPER FOR ENGINE FUEL LINE TUBE

FIELD OF THE INVENTION

This invention relates generally to tubing for conveying fluids, and more particularly it relates to an integral tube/nut stopper for an engine fuel line tube assembly.

BACKGROUND AND SUMMARY OF THE INVENTION

In an engine-powered automotive vehicle, liquid fuel for the engine is stored in one or more on-board fuel tanks. When the vehicle engine is running, fuel is conveyed from a tank through fuel supply line tubing to the engine fuel system where it is ultimately vaporized into a combustible charge that is combusted in the engine combustion chambers. In certain vehicle fuel systems, such as fuel injection systems, fuel return line tubing may be present to return excess fuel from the engine to a fuel tank.

Because a fuel tank is typically remote from an engine compartment of a vehicle, fuel lines must usually "snake" through available open space between a tank and the engine. Current industry practices utilize metal tubing, steel for example, for such fuel lines. A fuel line tube may comprise a particular geometry that includes multiple bends designed for fitting the tube to a particular installation in a particular vehicle. Such bends should not be so severe as to create restrictions that could impair desired fuel flow through the tube.

In order to provide for fluid-tight connection of fuel line tubing to other fuel system components, the ends of a length of metal tubing may have particular shapes, and the tubes may contain particular connector fittings for mating connection to such other components. For example, a connector fitting, such as an annular connecting nut for example, may be placed on a length of tubing so as to present an internal thread for attaching to a complementary thread of a mating part. A sleeve may be placed over the tube end distal to the connecting nut, and the distal end of the tube may be slightly flared, to provide a fluid-tight seal when the nut is threaded onto a mating part and tightened, drawing the tubing into fluid-tight connection with the mating part.

For assembly convenience, it is known to provide a fuel line tube assembly that comprises a nominally circular walled tube formed to a desired geometry and a connector fitting at one or both ends of the tube. The fuel line tube assembly is disposed in its intended installation location, and its connector fitting(s) are connected to mating components.

A connecting nut fitting that has a circular opening larger than the outside diameter (O.D.) of a circular walled tube on which it is disposed can slide along the length of the circular walled tube. Such a condition may pose a problem for installation of a fuel line tube assembly. For example, if a fuel line tube is relatively long and a connecting nut that is to connect one end of the tube to a mating component has slid to the opposite end, an installer may encounter difficulty, frustration, and even impossibility in sliding the nut back to the proper end. If such a condition happens after the fuel line tube assembly has been placed in its installation position, but before its connection to mating components, the problem may be even more severe. An installation where some or all of the length of a fuel line tube is generally vertical may be especially susceptible to this type of problem.

Accordingly, one general objective of the present invention is to provide a novel fuel line tube assembly that can eliminate problems of this type. A significant advantage of the invention is the provision of a solution that does not add additional parts to a fuel line tube assembly, and that does not create restrictions that might otherwise impair desired fuel flow through the tubing.

In one general aspect, the invention relates to an assembly comprising a length of drawn seamless metal tube and an annular fitting comprising a hole through which the tube passes, the tube comprising consecutive first, second, and third segments that are of substantially identical wall thickness throughout, the first and third segments comprising transverse cross sections that allow the fitting to travel along the respective lengths thereof, and the second segment comprising a transverse cross section that disallows travel of the fitting from one of the first and third segments, along the second segment, to the other of the first and third segments.

In another general aspect, the invention relates to a fuel line assembly for a fuel system of a fuel-consuming engine comprising a length of drawn seamless metal tube, an annular connecting fitting disposed on the tube proximate a terminus of the tube for making connection of an end of the tube containing the terminus to a mating component of the fuel system, the tube comprising consecutive first, second, and third segments that are of substantially identical wall thickness throughout, the first and third segments comprising transverse cross sections that allow the fitting to travel along the respective lengths thereof, and the second segment comprising a transverse cross section that disallows travel of the fitting from one of the first and third segments, along the second segment, to the other of the first and third segments.

In still another general aspect, the invention relates to a fuel line assembly for a fuel system of a fuel- consuming engine comprising a length of drawn seamless metal tube, an annular connecting fitting disposed on the tube proximate a terminus of the tube for making connection of an end of the tube containing the terminus to a mating component of the fuel system, the tube comprising consecutive first, second, and third segments that are of substantially identical wall thickness throughout, the first and third segments comprising substantially identical circular transverse cross sections that allow the fitting to travel along the respective lengths thereof, and the second segment comprising an oval transverse cross section that disallows travel of the fitting from one of the first and third segments, along the second segment, to the other of the first and third segments.

In still another general aspect, the invention relates to a method of making a fuel line assembly which comprises providing a length of nominally circular walled drawn seamless metal tube having substantially identical wall thickness and outside diameter throughout, providing an annular connecting fitting having an inside diameter that allows the fitting to be slid onto the tubing over the outside diameter of the tubing, sliding the connecting fitting onto the tube between a terminus of the tube and a segment of the tube spaced from the terminus of the tube, and re-forming at least a portion of that segment to a non-circular transverse cross section that provides an interference which prevents the fitting from sliding past that segment.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
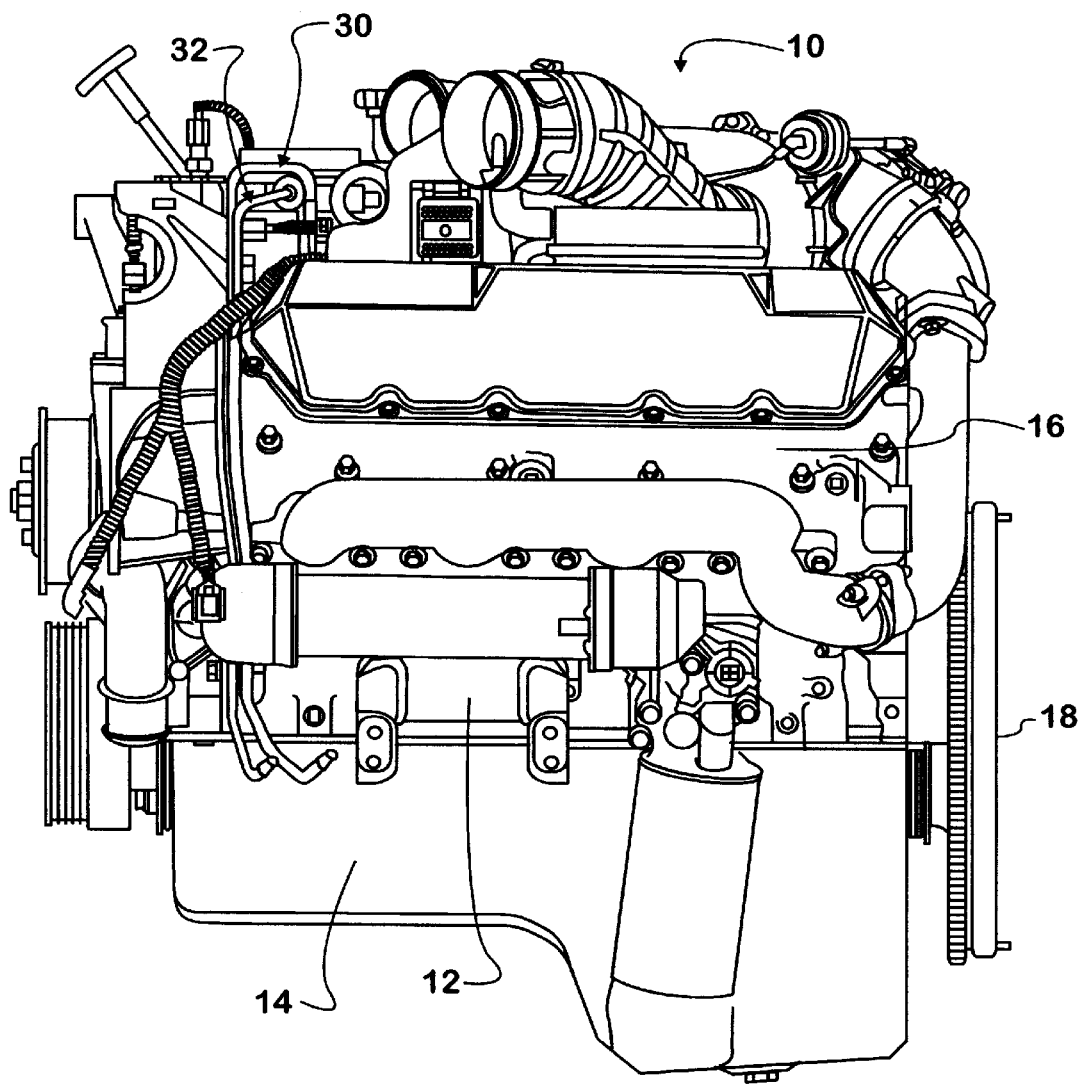
FIG. 1 is a side elevation view of an exemplary automotive vehicle internal combustion engine embodying fuel line tube assemblies in accordance with principles of the present invention.

FIG. 1 shows an exemplary internal combustion engine 10 comprising various known parts including an engine block 12, a crankcase 14, a cylinder head 16, a flywheel 18, and intake and exhaust systems.

Liquid fuel for the engine is stored in a remotely located fuel tank (not shown). When the engine is operating, fuel is delivered from the tank to the engine via a fuel supply system which includes a fuel line from the tank to the engine. In the illustrated embodiment, a portion of that fuel line includes a fuel supply tube assembly 30. The illustrated embodiment also includes a fuel return line from the engine to the tank that returns excess liquid fuel to the tank. A portion of that fuel return line appears as a fuel return tube assembly 32.

Figure 3:
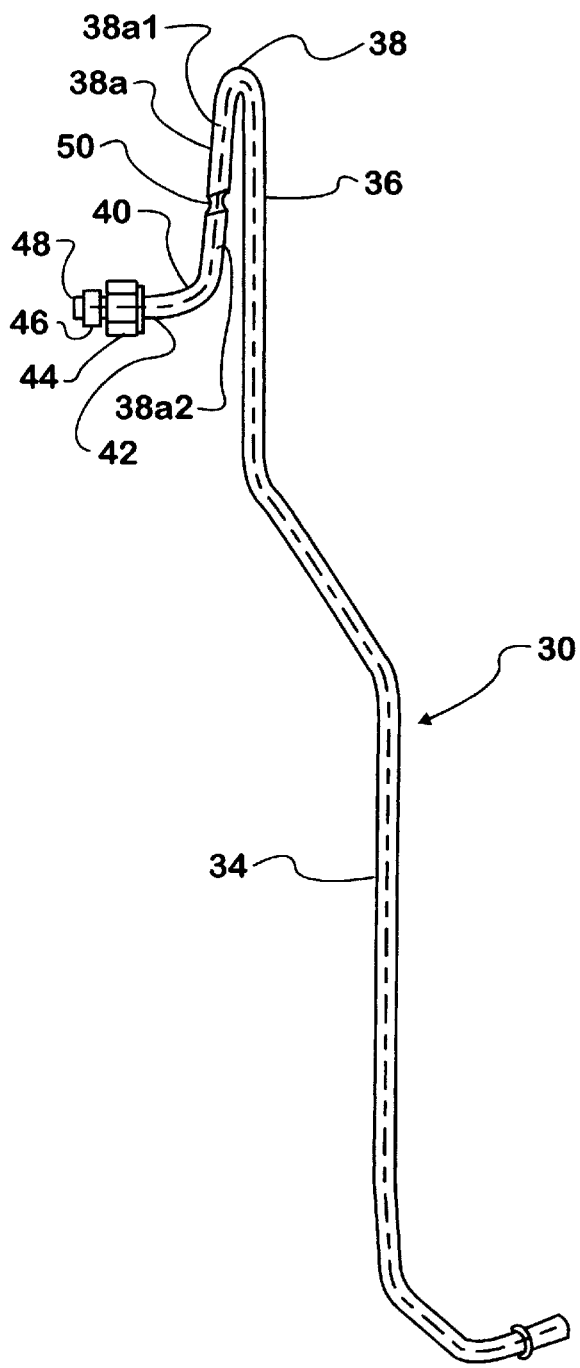
FIG. 3 is a view in the direction of arrows 3—3 in FIG. 2.
Figure 2:
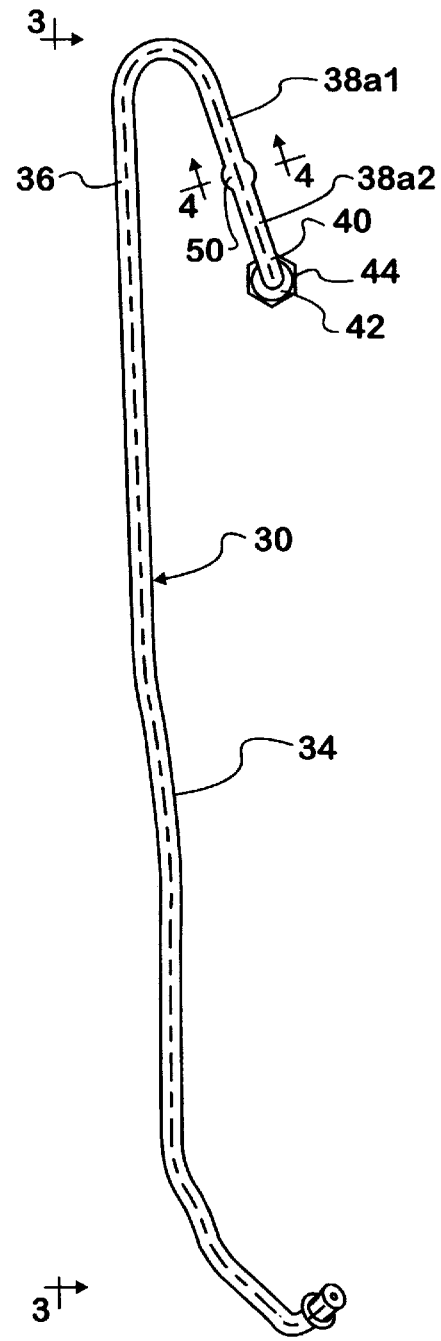
FIG. 2 is a view of a fuel line tube assembly similar to one of the fuel line tube assemblies of FIG. 1 shown by itself on an enlarged scale in the same direction as in FIG. 1.

Both assemblies 30, 32 are mounted on engine 10 in generally vertical orientations. Assembly 30 comprises a length of drawn seamless metal tube, steel for example, that has a particular geometry including multiple bends for allowing the tube to be fitted in the desired location on the engine. Further detail of a fuel supply line assembly whose geometry is similar to that of assembly 30 appears in FIGS. 2 and 3. It is fabricated from a nominally circular walled drawn seamless metal tube 34 that has substantially uniform wall thickness and outside diameter throughout. Segments of tube 34 that are straight are substantially circular. At the locations of its various bends, tube 34 is still substantially circular, although some slight departure from nominally circular may occur due to the bending. One terminus of tube 34 (the upper end) is connected in fluid-tight manner to a mating component of the fuel system atop engine 10; the other terminus of tube 34 (the lower end) is adapted for fluid type connection to another portion (not shown) of the fuel supply line from the tank.

Figure 5:
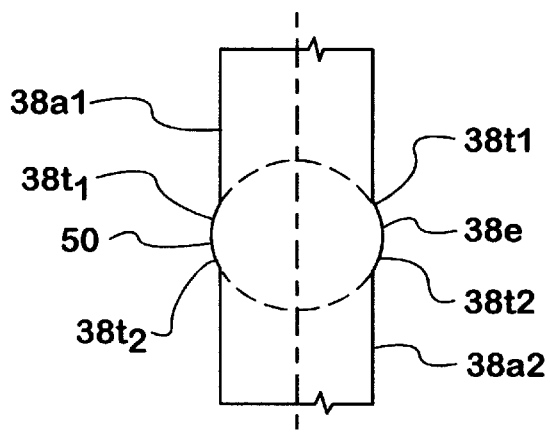
FIG. 5 is a fragmentary view in the direction of arrows 5—5 in FIG. 4.
Figure 4:
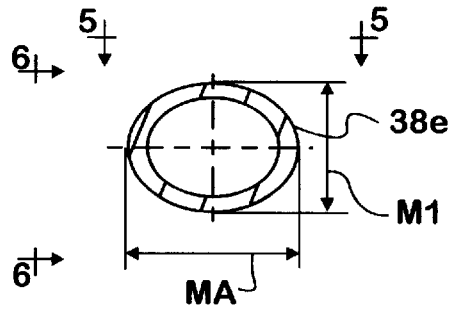
FIG. 4 is a transverse cross section view in the direction of arrows 4—4 in FIG. 2 on an enlarged scale.
Figure 6:
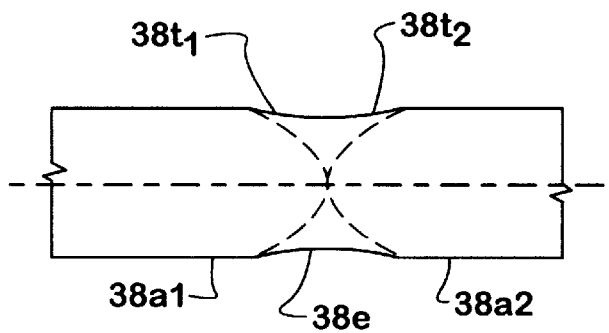
FIG. 6 is a fragmentary view in the direction of arrows 6—6 in FIG. 4.

An example of the inventive principles is disclosed in the following description involving the upper end of tube 34 and given with additional reference to FIGS. 4, 5, and 6. The upper end of tube 34 comprises in succession: a straight segment 36; a generally inverted U-shaped segment 38; and elbow segment 40; and a straight segment 42. An annular connecting nut 44 is shown disposed on straight segment 42 between elbow segment 40. A cylindrical sleeve member 46 is also disposed on straight segment 42, but distal to nut 44. The terminus of tube 34 beyond sleeve member 46 contains a flare 48 whose O.D. is greater than the inside diameter (I.D.) of sleeve member 46, thereby preventing the sleeve member from coming off the tube end. Sleeve member 46 has a wall whose maximum diameter exceeds the smallest I.D. of connecting nut 44. Hence, nut 44 is precluded from coming off the tube end.

The smallest I.D. of connecting nut 44 is however sufficiently large that the nut can slide along elbow segment 40 and onto a straight portion 38a of inverted U-segment 38 that extends from elbow segment 40. In accordance with principles of the present invention, portion 38a comprises a re-formation 50 of the tube wall providing an interference with nut 44 that prevents the nut from sliding past the reformation. Re-formation 50 is present between a straight segment 38a1 and a straight segment 38a2 of the tube. The reformation comprises a non-circular walled segment 38e, a walled transition segment 38t1 that transitions straight segment 38a1 to non-circular segment 38e, and a walled transition segment 38t2 that transitions non-circular segment 38e to straight segment 38a2. Detail of an exemplary transverse cross section of non-circular segment 38e appears in FIG. 4. It can be seen that the outside and inside wall surfaces of the cross section each has an oval shape, for example an ellipse. The outside surface has a major axis equal to MA and a minor axis equal to MI. It is across the major axis MA, and immediately contiguous portions of the tube wall that re-formation 50 provides an interference with connecting nut 44. As can be seen particularly from FIG. 3, the non-circular cross section of the inside wall surface can be slightly skewed to an imaginary straight axis that is shared by straight segments 38a1 and 38a2.

It is to be understood that the word "oval" herein describing the transverse cross-section of walled segment 38e is used in a generic sense, and therefore includes, but is not necessarily limited to, the exemplary elliptical shape that is shown in the drawings.

Figure 7:
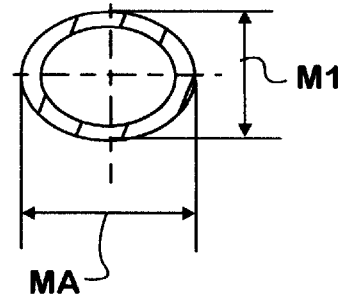
FIG. 7 is a view of a fuel line tube assembly similar to another of the fuel line tube assemblies of FIG. 1 shown by itself on an enlarged scale in the same direction as in FIG. 1.
Figure 8:
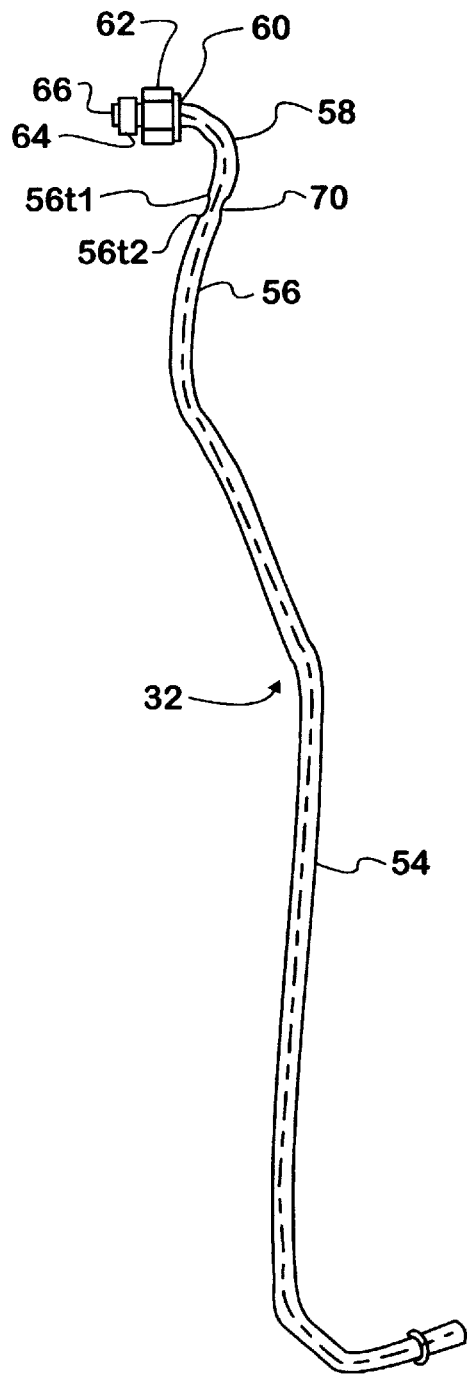
FIG. 8 is a view in the direction of arrows 8—8 in FIG. 7.
Figure 9:
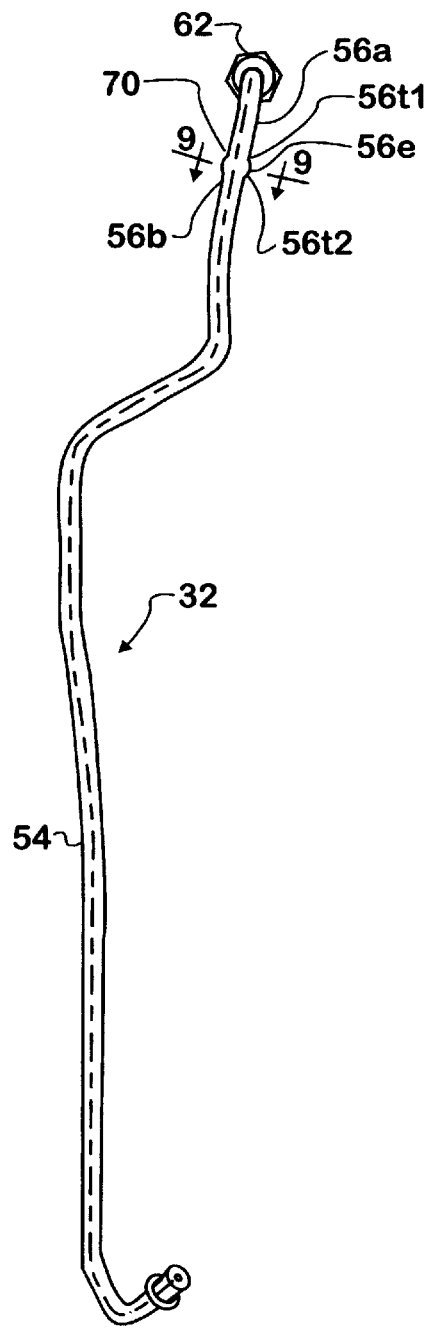
FIG. 9 is a transverse cross section view in the direction of arrows 9—9 in FIG. 7 on an enlarged scale.

Assembly 32 also comprises a length of drawn seamless metal tube that has a particular geometry including multiple bends for allowing the tube to be fitted in the desired location on the engine proximate assembly 30. Further detail of a fuel return line assembly whose geometry is similar to that of assembly 32 appears in FIGS. 7, 8, and 9. That assembly comprises a nominally circular walled drawn seamless metal tube 54. Segments of tube 54 that are straight are essentially circular. At the locations of its various bends, tube 54 is substantially circular, although some slight departure may occur due to bending. One terminus of tube 54 (the upper end) is connected in fluid-tight manner to a mating component of the fuel system atop engine 10; the other terminus of tube 54 (the lower end) is adapted for fluid type connection to another portion (not shown) of the fuel return line to the tank.

Another example of the inventive principles is disclosed in the following description involving the upper end of tube 54. The upper end of tube 54 comprises in succession: a straight segment 56; an elbow segment 58; and a straight segment 60. An annular connecting nut 62 is shown disposed on straight segment 60 between elbow segment 58 and a cylindrical sleeve member 64 that is also disposed on straight segment 60. The terminus of tube 54 beyond sleeve member 64 contains a flare 66 whose O.D. is greater than the inside diameter (I.D.) of sleeve member 64, thereby preventing the sleeve member from coming off the tube end. Sleeve member 64 has a wall whose maximum diameter exceeds the smallest I.D. of connecting nut 62. Hence, nut 62 is precluded from coming off the tube end.

The smallest I.D. of connecting nut 62 is however sufficiently large that the nut can slide along elbow segment 58 and onto straight segment 56. In accordance with principles of the present invention, segment 56 comprises a re-formation 70 of the tube wall providing an interference with nut 62 that prevents the nut from sliding past the re-formation. Reformation 70 is present between a straight segment 56a and a straight segment 56b of the tube. The re-formation comprises a non-circular walled segment 56e, a walled transition segment 56t1 that transitions straight segment 56a to non-circular segment 56e, and a walled transition segment 56t2 that transitions non-circular segment 56e to straight segment 56b. Detail of the cross section of non-circular segment 56e appears in FIG. 9. It can be seen that the inside and outside wall surfaces of the cross section each has an oval shape, for example an ellipse. The outside surface has a major axis equal to MA and a minor axis equal to MI. It is across the major axis MA, and immediately contiguous portions of the wall that re-formation 70 provides an interference with connecting nut 62. As can be seen particularly from FIG. 7, the non-circular cross section of the inside wall surface is not skewed to an imaginary straight axis that is shared by straight segments 56a and 56b, but rather is perpendicular to that axis.

The creation of re-formations 50 and 70 can be performed by placing the appropriate portion of a tube in a suitably shaped die of a press, or similar device, and operating it to re-form the nominally circular walled tube into the shape described. Drawn seamless steel tubing having a nominal 0.312 inch circular O.D. and a 0.028 inch wall thickness is an example of tubing that can be endowed with the inventive principles. The creation of a nut-stopping formation in accordance with the invention should create no significant impairment of flow through the tubing. It is an advantage of the invention that no additional parts are added to the tubing assembly by inclusion of such a nut-stopping formation. The axial dimension of a re-formation 50, 70 is approximately the same as the O.D. of the nominally circular tube. The transition segments progressively smoothly transition the circular walled segments to the oval walled segment by gradually progressively changing in cross section along the axial, or lengthwise, dimension of each transition segment.

The finished tubing assembly comprises a connecting fitting, such as a connector nut, captured along a portion of the length of the tubing proximate one end. Because the connecting fitting is captured on the tube, it is conveniently accessible to the installer. When the connecting fitting is a nut like the ones shown herein, a threaded portion of the nut that is open toward a mating thread is engaged with the latter, and the two are screwed together. A suitable tool may be used to engage a tool-engagement surface on the exterior of the nut, a hex for example, to tighten the fitting and thereby create a fluid-tight connection.

While a presently preferred embodiment of the invention has been illustrated and described, it should be appreciated that principles of the invention are applicable to all embodiments that fall within the scope of the following claims.

What is claimed is:

1. An assembly comprising a length of drawn seamless metal tube and an annular fitting comprising a hole through which the tube passes, the tube comprising consecutive first, second, and third segments that are of substantially identical wall thickness throughout, the first and third segments comprising transverse cross sections that allow the fitting to travel along the respective lengths thereof, and the second segment comprising a transverse cross section that disallows travel of the fitting from one of the first and third segments, along the second segment, to the other of the first and third segments, in which the first and third segments comprise substantially identical circular transverse cross sections, and the second segment comprises an intermediate segment having a non-circular transverse cross section, a first transition segment progressively transitioning the intermediate segment to the first segment, and a second transition segment progressively transitioning the intermediate segment to the third segment.

2. An assembly as set forth in claim 1 in which the combined lengthwise extents of the first transition segment, the intermediate segment, and the second transition segment are approximately equal to the outside diameters of the first and third segments.

3. An assembly as set forth in claim 1 in which the intermediate segment has an oval transverse cross section that is perpendicular to a straight axis that is shared by the first and third segments.

4. An assembly as set forth in claim 1 in which the intermediate segment has an oval transverse cross section that is skewed to a straight axis that is shared by the first and third segments.

5. An assembly as set forth in claim 1 in which the tube comprises a terminus at one lengthwise end of the first segments and further including a sleeve disposed on the first segment between the terminus of the tube and the annular fitting.

6. An assembly comprising a length of drawn seamless metal tube and an annular fitting comprising a hole through which the tube passes, the tube comprising consecutive first, second, and third segments that are of substantially identical wall thickness throughout, the first and third segments comprising transverse cross sections that allow the fitting to travel along the respective lengths thereof, and the second segment comprising a transverse cross section that disallows travel of the fitting from one of the first and third segments, along the second segment, to the other of the first and third segments, in which the tube comprises a terminus at one lengthwise end of the first segment, and further including a sleeve disposed on the first segment between the terminus of the tube and the annular fitting.

7. An assembly as set forth in claim 6 still further including a flare at the terminus of the tube providing an interference with the sleeve that prevents the sleeve from coming off the tube.

8. An assembly as set forth in claim 6 in which the annular fitting comprises a screw thread disposed generally concentrically about the tube via which the fitting can connect the tube to a mating part.

9. An assembly comprising a length of drawn seamless metal tube and an annular fitting comprising a hole through which the tube passes, the tube comprising consecutive first, second, and third segments that are of substantially identical wall thickness throughout, the first and third segments comprising transverse cross sections that allow the fitting to travel along the respective lengths thereof, and the second segment comprising a transverse cross section that disallows travel of the fitting from one of the first and third segments, along the second segment, to the other of the first and third segments, in which the first and third segments are straight and share a common straight axis.

10. A fuel line assembly for a fuel system of a fuel-consuming engine comprising a length of drawn seamless metal tube, an annular connecting fitting disposed on the tube proximate a terminus of the tube for making connection of an end of the tube containing the terminus to a mating component of the fuel system, the tube comprising consecutive first, second, and third segments that are of substantially identical wall thickness throughout, the first and third segments comprising transverse cross sections that allow the fitting to travel along the respective lengths thereof, and the second segment comprising a transverse cross section that disallows travel of the fitting from one of the first and third segments, along the second segment, to the other of the first and third segments, in which the first and third segments comprise substantially identical circular transverse cross sections, and the second segment comprises an intermediate segment having a non-circular transverse cross section, a first transition segment progressively transitioning the intermediate segment to the first segment, and a second transition segment progressively transitioning the intermediate segment to the third segment.

11. An assembly as set forth in claim 10 in which the combined lengthwise extents of the first transition segment, the intermediate segment, and the second transition segment are approximately equal to the outside diameters of the first and third segments.

12. An assembly as set forth in claim 10 in which the intermediate segment has an oval transverse cross section that is perpendicular to a straight axis that is shared by the first and third segments.

13. An assembly as set forth in claim 10 in which the intermediate segment has an oval transverse cross section that is skewed to a straight axis that is shared by the first and third segments.

14. A fuel line assembly for a fuel system of a fuel-consuming engine comprising a length of drawn seamless metal tubs, an annular connecting fitting disposed on the tube proximate a terminus of the tube for making connection of an end of the tube containing the terminus to a mating component of the fuel system, the tube comprising consecutive first, second, and third segments that are of substantially identical wall thickness throughout, the first and third segments comprising transverse cross sections that allow the fitting to travel along the respective lengths thereof, and the second segment comprising a transverse cross section that disallows travel of the fitting from one of the first and third segments, along the second segment, to the other of the first and third segments, further including a sleeve disposed on the first segment between the terminus of the tube and the connecting fitting.

15. An assembly as set forth in claim 14 still further including a flare at the terminus of the tube providing an interference with the sleeve that prevents the sleeve from coming off the tube.

16. An assembly as set forth in claim 14 in which the connecting fitting comprises a screw thread disposed generally concentrically about the tube via which the fitting can connect the tube to a mating part.

17. A fuel line assembly for a fuel system of a fuel-consuming engine comprising a length of drawn seamless metal tube, an annular connecting fitting disposed on the tube proximate a terminus of the tube for making connection of an end of the tube containing the terminus to a mating component of the fuel system, the tube comprising consecutive first, second, and third segments that are of substantially identical wall thickness throughout the first and third segments comprising transverse cross sections that allow the fitting to travel alone the respective lengths thereof, and the second segment comprising a transverse cross section that disallows travel of the fitting from one of the first and third segments, along the second segment, to the other of the first and third segments, in which the first and third segments are straight and share a common straight axis.

18. A fuel line assembly for a fuel system of a fuel-consuming engine comprising a length of drawn seamless metal tube, an annular connecting fitting disposed on the tube proximate a terminus of the tube for making connection of an end of the tube containing the terminus to a mating component of the fuel system, the tube comprising consecutive first, second, and third segments that are of substantially identical wall thickness throughout, the first and third segments comprising substantially identical circular transverse cross sections that allow the fitting to travel along the respective lengths thereof, and the second segment comprising an oval transverse cross section that disallows travel of the fitting from one of the first and third segments, along the second segment, to the other of the first and third segments.

19. A method of making a fuel line assembly which comprises providing a length of nominally circular walled drawn seamless metal tube having substantially identical wall thickness and outside diameter throughout, providing an annular connecting fitting having an inside diameter that allows the fitting to be slid onto the tubing over the outside diameter of the tubing, sliding the connecting fitting onto the tube between a terminus of the tube and a segment of the tube spaced from the terminus of the tube, and re-forming that segment to an intermediate portion having a non-circular transverse cross section that provides an interference which prevents the fitting from sliding past that segment, a first transition portion progressively transitioning the intermediate portion to the nominally circular wall in one direction along the tube, and a second transition segment progressively transitioning the intermediate segment to the nominally circular wall in an opposite direction along the tube.

20. A method as set forth in claim 19 including providing an interference between the terminus of the tube and the fitting that prevents the fitting from coming off the tube.

21. An assembly as set forth in claim 10 further including a sleeve disposed on the first segment between the terminus of the tube and the connecting fitting.

* * * * *